July 1, 1952  J. W. KARSTED  2,601,743
PLANT SUPPORTING DEVICE
Filed Sept. 30, 1948

Inventor
Jessie W. Karsted

By *Clarence A. O'Brien and Harvey B. Jacobson*
Attorneys

Patented July 1, 1952

2,601,743

UNITED STATES PATENT OFFICE 2,601,743

PLANT SUPPORTING DEVICE

Jessie W. Karsted, Washington, D. C.

Application September 30, 1948, Serial No. 52,017

1 Claim. (Cl. 47—41)

This invention relates to the propagation of plant growth by the aqua-culture method, or without the use of soil, and has more particular reference to a novel device for individually supporting plants in a bowl or like nutrient-solution container so that natural growth of the plants is allowed.

A more specific object of the invention is to provide a device of the above kind in which the supporting element for each plant is in the nature of a cylindrical helix of such diameter and having its convolutions so spaced as to be adapted to have the roots and lower branches of the plant freely extend outwardly therebetween in all directions for free growth, and to have said roots and branches rest on said convolutions adjacent the stalk or main axis of the plant to prevent the plant from resting at its lower end on a supporting surface and thereby becoming injured or deformed.

The exact nature of the invention will become apparent from the following description when considered in connection with the accompanying drawings, in which.

Figure 1:
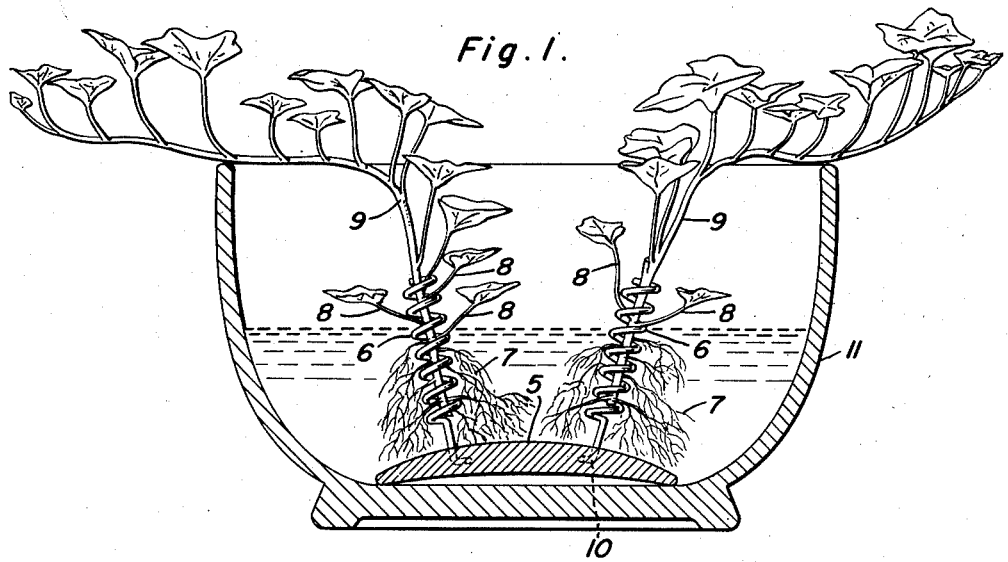
Figure 1 is a view partly in vertical section and partly in elevation, of a plant supporting device constructed in accordance with the present invention, and showing the manner in which the device is used.
Figure 2:
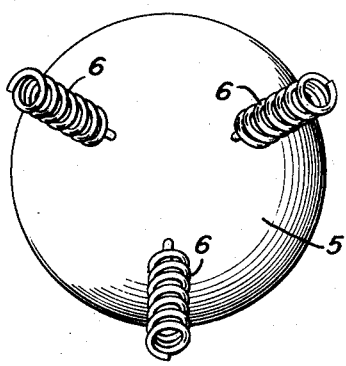
Figure 2 is a top plan view of the device.

Referring in detail to the drawing, the present device comprises a base plate 5 which is preferably formed of some non-corrosive material, and which is also preferably circular and of convex form in cross section as shown in Figures 1 and 2, and a plurality of upstanding plant supporting elements 6 carried by and arranged in uniformly and considerably spaced and upwardly diverging relation about the axis of the base plate.

Figure 3:
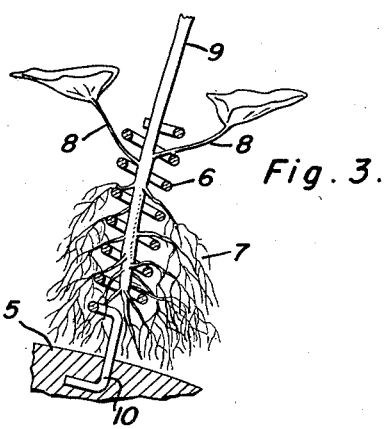
Figure 3 is a fragmentary vertical section taken centrally through one of the supporting elements with the stalk of a plant disposed therein.

Each plant supporting element consists of a bendable but non-resilient wire coiled to provide a cylindrical helix of relatively small diameter and having its convolutions considerably spread apart to provide sufficient space therebetween through which the roots 7 and lower branches 8 of a plant 9 may freely extend when the stalk or main axis of the plant is inserted in the helix as shown in Figures 1 and 3, whereby said roots and lower branches rest on said convolutions adjacent the stalk and sustain the weight of the plant. In this way, the weight of the plant is not placed on the main root or lower end of the stalk and natural growth of the stalk, roots and lower branches of the plant, without material distortion thereof, is insured. A portion of the wire at the lower end of the helix is straight and coaxial with the helix to provide a non-resilient but bendable shank 10, which extends downwardly and has a laterally angulated lower extremity embedded in the base plate 5.

In using the device, the lower end of the stalk of a plant is inserted in each helix while turning the plant and otherwise threading its roots and lower branches through the space between the convolutions of said helix until the lower roots are in proximity to or lightly contact the base plate. In this way, the roots and lower branches are disposed to extend freely outwardly between and rest on the convolutions of the helix to sustain the weight of the plant, and natural growth of the lower part of the stalk and the lower branches and roots of the plant, without material distortion thereof, is insured. The device, with the plants placed therein, is then inserted in a bowl or like water or nutrient-solution container 11 so that the base plate 5 rests on and centrally of the bottom of the latter and the upper portions of the plants project upwardly from the container. The water or nutrient-solution is kept at a proper level in the container to submerge the roots of the plants and thereby properly feed the latter for propagation of their growth.

It is to be noted that by virtue of the bendable, non-resilient shank 10, each helix may be adjusted angularly relative to the base plate or relative to another helix, whereby to support the plants in a properly arranged manner in the container.

From the foregoing description, it is believed that the nature, manner of use and advantages of the present invention will be readily understood and appreciated by those skilled in the art. Minor changes and modifications are contemplated, such as fairly fall within the spirit and scope of the invention as claimed.

What is claimed as new is:

A device for supporting the root of a plant in an aqua-cultural solution, said device comprising a base and a wire rod coiled to provide a helical upwardly extending plant root receiving member, a portion of said rod at the lower end of said member being straight and coaxial with the member to provide a non-resilient but bendable shank extending downwardly into said base, said shank having a laterally angulated lower extremity embedded in the base, said member having coils all of which are spaced from one another whereby to afford a continuous helical plant root receiving passage extending from the top to the bottom of the member and open at its lower end, the upper extremity of said rod being spaced upwardly from the uppermost coil of said member whereby said passage is also open at the upper end thereof to permit rotative feeding of a plant root downwardly through the member with the root branches projecting outwardly through said passage in supporting engagement by the coils of said member.

JESSIE W. KARSTED.

REFERENCES CITED

The following references are of record in the file of this patent:

UNITED STATES PATENTS

| Number | Name | Date |
|---|---|---|
| 1,515,787 | Nishiyama et al. | Nov. 18, 1924 |
| 2,151,192 | Crosser | Mar. 21, 1939 |
| 2,189,510 | Swaney | Feb. 6, 1940 |